United States Patent

Novak

[15] 3,663,964
[45] May 23, 1972

[54] METHOD OF GARMENT MANUFACTURE

[72] Inventor: Michael J. Novak, Brookfield, Ill.

[73] Assignee: Hart Schaffner & Marx, Chicago, Ill.

[22] Filed: Nov. 16, 1970

[21] Appl. No.: 90,011

Related U.S. Application Data

[63] Continuation-in-part of Ser. No. 739,845, June 25, 1968, and a continuation-in-part of Ser. No. 759,528, Sept. 12, 1968.

[52] U.S. Cl. ...........................................................2/243 R
[51] Int. Cl. ..................................................................A41d
[58] Field of Search............2/243 R; 38/144; 8/115.5, 115.6, 8/116, 116.3, 127.6, 128

[56] References Cited

UNITED STATES PATENTS

| | | | |
|---|---|---|---|
| 2,769,584 | 11/1956 | Zinamon et al. | 223/30 |
| 2,817,468 | 12/1957 | Brown | 2/243 R X |
| 2,974,432 | 3/1961 | Warnock et al. | 2/243 R X |
| 3,216,781 | 11/1965 | Pardo et al. | 38/144 X |
| 3,341,955 | 9/1967 | Pyke et al. | 38/144 |
| 3,385,653 | 5/1968 | Whitfield et al. | 8/128 X |
| 3,407,026 | 10/1968 | Mauldin | 8/116.3 X |
| 3,434,161 | 3/1969 | Walsh | 2/243 R |
| 3,458,869 | 8/1969 | Gordon | 2/243 R |
| 3,434,794 | 3/1969 | Tovey | 8/116 R X |
| 3,440,002 | 4/1969 | Whitfield et al. | 9/128 X |

*Primary Examiner*—Alfred R. Guest
*Attorney*—Parker, Carter & Markey

[57] ABSTRACT

A method of garment manufacture in which fabric material is treated with a polymeric resin, pieces of the fabric are joined together while the resin is in its uncured state, and the resin is cured by steam pressing so that any puckering or wrinkling o the fabric is removed while the material is stabilized.

1 Claim, No Drawings

METHOD OF GARMENT MANUFACTURE

This application is a continuation-in-part of copending applications Ser. No. 739,845, filed June 25, 1968, and No. 759,528, filed Sept. 12, 1968 by the applicant herein.

SUMMARY OF THE INVENTION

This application relates to a method of tailored garment manufacture and more particularly relates to a method of garment manufacture employing fabric treated with stabilizing polymeric resins.

Stabilizing polymeric resins have been used for treating fabrics, particularly permanent press fabrics, to impart characteristics such as improved crease resistance, reduced felting or shrinkage during washing, increased resistance to acids, alkalis, or oxidizing solutions, and fabric strengthening. In one prior method of garment manufacture as illustrated by U.S. Pat. No. 2,974,432, a fabric is impregnated with a thermosetting resin solution by a padding step, the excess solution is extracted under pressure, the fabric is finished into a garment by cutting, sewing, finishing and pressing, and the garment is then placed in an oven where the resin is cured. As a result of these many steps, the operation is costly and inefficient.

During the usual garment manufacturing process variations in the cutting and sewing by different workers and changes in humidity conditions may result in puckering or wrinkling of the joined material. Where the puckering is severe, the workers must resort to costly "busheling" in which the pieces are ripped apart and repaired.

Accordingly, it is an object of this invention to provide an inexpensive and efficient method of garment manufacture in which any puckering resulting as the garment is made is permanently removed.

Another object is to provide a method of garment manufacture in which a polymeric resin is applied to fabric material in place of the usual sponging operation, pieces from the fabric are joined during the garment finished operation while the resin is in the uncured state, and the joined pieces are steam pressed so that the resin is cured while simultaneously removing any puckering which may have developed.

Another object is to provide a method of garment manufacture in which a highly reactive polyethylene resin in solution with a softening agent and solvent are applied to a fabric, the solvent is removed, pieces cut from the fabric are joined together while the resin is in its uncured state, and the joined pieces are steam pressed to cross-link the resin for curing so that any puckering is removed and the resulting garment is stabilized with a freshly pressed look even under adverse temperature and humidity conditions.

BRIEF DESCRIPTION OF THE DISCLOSURE

In accordance with the invention, the desired fabric material is entirely treated with a solution containing a cross-linkable polymeric resin of the type disclosed in copending applications Ser. Nos. 739,845 and 759,528. Examples of such a resin are the terpolymers sold under the trademarks "Zeset T" and "Zeset TP" by the DuPont Company. Such terpolymers contain highly reactive chloride groups having the formula —COCl and are derivatives of polyethylene, methacryloyl chloride and vinyl acetate. Preferred terpolymer resins which may be employed have the following compositions: (1) 70% wt. ethylene, 7% wt. methacryloyl chloride, 23% wt. vinyl acetate, (2) 82.8% wt. ethylene, 3.5% methacryloyl chloride, 13.7% wt. vinyl acetate, and (3) 70% wt. ethylene, 6% wt. methacryloyl chloride, 24% wt. vinyl acetate.

Two copolymer derivatives which may be employed have the following compositions: (1) 96% wt. ethylene, 4% wt. methacryloyl chloride, and (2) 91% wt. ethylene and 9% wt. methacryloyl chloride.

The solution is prepared by dissolving the resin into any aromatic solvent not containing active hydrogens. Chlorinated hydrocarbons such as perchlorethylene, trichloroethylene, or 1,1,1 trichloroethane may be employed. Since the resin in its cured state will increase the firmness of hand of the fabric, a suitable softening agent may be employed. A preferred softening agent is that sold under the trademark "Methacrol Z" by the DuPont Company. This softening agent is understood to be a thermoplastic resin dispersion.

The solution may also contain a soil release agent, such as that sold under the trademark "Zepel" by the DuPont Company or that sold under the trademark "Scotchgard" by the 3M Company. The soil release agents are understood to be fluorcarbon resins. Where Zepel is used, it is preferred to use as the softening agent a diisocynate such as that sold under the trademark "DDI 1410" by General Mills, Inc.

The fabric material is treated with the solution in place of the usual sponging or preshrinking operations. Depending on the type of fabric, the amount of resin and softener applied is carefully controlled for proper stabilization and hand characteristics. With fabrics of wool or combinations of Dacron/wool, silk/wool, etc. the amount of stabilizing resin deposited on the fabric should be between about 2.3–4.0% by wt. for good stability and with the softening agent between about 0.75–1.5% by wt. for good hand.

The resin is applied by suitable means such as by spraying onto a moving strip of fabric material. After this the solvent is removed with the resin deposited on the fabric in its uncured state. Solvent removal may be effected by boiling the solvent off as the material is passed over one or more steamchest rollers in a chamber where the solvent may be recovered for reuse. The fabric is then taken to a garment make-up room where is it cut into the size and shape desired by the particular garment. Various of the pieces are joined together as by sewing and finishing to provide the completed garment. During these operations the joined pieces are pressed in the usual manner. Any puckering of the material resulting from variations in cutting or sewing by different workers, or from changes in humidity, will be removed during the steam pressing operation. As the resin is contacted by the steam, preferably at a varporizing temperature under a pressure of one atmosphere, it is cross-linked and cured on the fabric to produce dimensional stability. The puckering or wrinkling will thus be permanently removed even where the garment is subjected to adverse temperature and humidity conditions.

It is understood that the highly reactive chloride groups having the formula —COCl on the polymer molecule chain provide sites for reaction with active hydrogen groups on the fabric. Water at elevated temperatures, such as steam, will cause hydrolysis so that an interchain anyhydride linkage occurs, and the polymer becomes cross-linked and insoluble. It is believed that stabilization results as the resin welds fiber strands together and forms a coating or film around the strands.

The following examples illustrate several specific fabric treating processes according to the invention.

EXAMPLE I

A solution was prepared with the following composition:

| | |
|---|---|
| Zeset T | 11.25 lbs. |
| Methacryl Z | 15 oz. |
| Perchloroethylene | 7.5 lbs. |
| 1,1,1 Trichloroethane | 55 lbs. |

The Zeset T was dissolved in a portion of the prechloroethylene, melted by heating to 140° F., and then dissolved in 1,1,1 trichloroethane. The Methacryl Z and the remaining perchloroethylene were then mixed and added to the dissolved Zeset T. The solution was then agitated for approximately 30 minutes. The solution was applied by spraying at a controlled rate to deposit 3 percent by weight on the fabric, after which the solvent was recovered. The following fabrics were treated:

(1) 11 oz./yd.—55 Dacron/45 wool (by %)
(2) 7.6 oz./yd.—53 Dacron/27 wool/20 mohair
(3) 12 oz./yd.—100 wool
(4) 11 oz.yd.—silk and wool blend The foregoing treated fabric material was then cut into the desired pieces which were sewed together in a make-up room. The joined pieces were steam pressed to cure the resin as the garments were made. Puckering was removed during the steam pressing operation and the resulting garments exhibited good stability characteristics, held their size and shape in spite of repeated wear and dry cleaning, and retained a freshly pressed look even in high humidity conditions. A treated 55 Dacron/45 wool suit tested in a chamber at 90 percent relative humidity and 95° F. for 23 hours showed good stability when compared with an untreated suit.

EXAMPLE II

A solution was prepared with the following composition:

| | |
|---|---|
| Zeset TP | 1.5 lbs. |
| Methacryl Z | 6.0 oz. |
| Perchloroethylene | 3.0 lbs. |
| 1,1,1 Trichloroethane | 25 lbs. |

The Zeset TP was melted at 140°–150° F. and mixed with the perchloroethylene. This was then mixed with 90 percent of the 1,1,1 trichloroethane. The Methacryl Z was mixed with the remaining 10 percent of solvent, added to the diluted Zeset in the mixing tank, and agitated. The spray pressure and fabric strip speed were adjusted to deposit 3% wt. stabilizing resin and 0.75% wt. softener on the fabric.

The solution was applied to the following 11–12 oz./yd. fabrics and the solvent recovered:
1. 55 Dacron/45 wool (by %)
2. 94 wool/6 silk
3. 89 wool/11 silk
4. 100 wool
5. 90 wool/10 silk
6. 87 wool/13 silk
7. wool/polyester blend Pieces were cut from these fabrics, joined together in a make-up room, steam pressed, and finished into garments which exhibited good stability, appearance and freedom from puckering.

EXAMPLE III

A solution was prepared as in the manner of Example II with the following composition:

| | |
|---|---|
| Zeset TP | 1.0 lbs. |
| Methacryl Z | 3.0 oz. |
| Perchloroethylene | 2.0 lbs. |
| 1,1,1 Trichloroethane | 17.0 lbs. |

The solution was sprayed onto 11 oz./yd. 55 Dacron/45 wool fabric at a rate to deposit 4% wt. stabilizing resin and 0.75% softener, and the solvent was recovered. Pieces cut from the fabric were joined together in a make-up room, steam pressed, and finished into garments which were free from any puckering, exhibited good hand and stability characteristics, and had a well-tailored look.

The foregoing examples illustrate that this invention provides a novel method of garment manufacture affording a more efficient and improved tailoring operation resulting in a garment of superior appearance which will retain a well-pressed look even under adverse temperature and humidity conditions. Treatment of the fabric with the polymeric resin of the invention eliminates preshrinking operations heretofore used, such as cold water shrinking, steaming or sponging machines. The resin is deposited in a one-pass operation after which the solvent is recovered. Pieces cut from the fabric are joined together by a worker and steam pressed to cure the resin and stabilize the fabric. Any puckering or wrinkling resulting during tailoring, such as from variations in humidity conditions or from the different skills of the workers, will be removed by a single pressing operation while the fabric is simultaneously and permanently stabilized in its finished, tailored look. This reduces the need for costly "busheling" which is normally done to rip apart and repair cloth which has puckered after the sewing operation.

It will be understood that various changes in the details, material and steps, which have been described and illustrated in order to explain the nature of the invention, may be made by those skilled in the art within the principal and scope of the invention.

The embodiments of the invention in which an exclusive property or privilege is claimed are defined as follows:

1. The method of making a tailored garment of at least a partially wool, non-permanent press fabric adapted for tailoring and dry cleaning and nonamenable to washing, while eliminating preshrinking and busheling steps, said method including the steps of depositing on the entirety of said fabric a cross-linkable polymeric resin having reactive —COCl groups in its uncured state in the amount of between 2.3% and 4% by weight of said fabric, depositing simultaneously on the entirety of said fabric a softening agent in the amount of between 0.75% and 1.5% by weight of said fabric, removing pieces from the fabric in preselected patterns, sewing said pieces together to form the tailored garment with the resin in a non-cured state and pressing said garment while subjecting said garment to water heated to a vaporizing temperature of the order of 100° C. and at a pressure of one atmosphere to avoid busheling, remove wrinkling and puckering in the fabric and simultaneously to cross-link the resin deposited on the fabric.

* * * * *